US010853040B2

(12) United States Patent
Grabar et al.

(10) Patent No.: US 10,853,040 B2
(45) Date of Patent: Dec. 1, 2020

(54) ADDRESS SPACE SPLITTING FOR LEGACY APPLICATION COMPATIBILITY

(71) Applicant: Microsoft Technology Licensing, LLC, Redmond, WA (US)

(72) Inventors: Anatoly V. Grabar, Redmond, WA (US); Howard J. Dickerman, Bellevue, WA (US); Venkata S. Irava, Bothell, WA (US); Joshua J. Burkholder, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 281 days.

(21) Appl. No.: 15/476,563

(22) Filed: Mar. 31, 2017

(65) Prior Publication Data

US 2018/0285152 A1   Oct. 4, 2018

(51) Int. Cl.
*G06F 9/46*     (2006.01)
*G06F 8/20*     (2018.01)
(Continued)

(52) U.S. Cl.
CPC ............ *G06F 8/24* (2013.01); *G06F 9/44526* (2013.01); *G06F 9/44542* (2013.01);
(Continued)

(58) Field of Classification Search
CPC ...... G06F 9/4881; G06F 8/24; G06F 9/44526; G06F 9/44542; G06F 9/455; G06F 9/4843; G06F 9/54
See application file for complete search history.

(56) References Cited

U.S. PATENT DOCUMENTS 7,401,178 B1 * 7/2008 Tene .................. G06F 9/45537
                                                              711/2
7,478,388 B1   1/2009 Chen et al.
(Continued)

FOREIGN PATENT DOCUMENTS

WO   2016090554 A1   6/2016

OTHER PUBLICATIONS

Amalfitano, et al., "Migrating legacy spreadsheets-based systems to Web MVC architecture: An industrial case study", In Proceedings of IEEE Conference on Software Maintenance, Reengineering and Reverse Engineering, Feb. 3, 2014, pp. 387-390.
(Continued)

*Primary Examiner* — Wissam Rashid
(74) *Attorney, Agent, or Firm* — Schwegman Lundberg & Woessner, P.A.

(57) ABSTRACT

Systems and devices for coordinating heterogeneous processes of a software application to comply with multiple address spaces or other computing system constraints are disclosed. In an example, operations for coordinating data processing among multiple processes of a software application include: executing a first process of the software application, as the first process operates with a first capability that is limited to an operational constraint of the computing system; initiating a second process of the software application, as the second process is initiated as a child of the first process, and as the second process operates with a second capability that exceeds the operational constraint of the computing system; communicating data from the first process of the software application to the second process; and receiving data from the second process of the software application, in response to the data being processed by the data analysis operations of the second process.

20 Claims, 7 Drawing Sheets

(51) Int. Cl.
    *G06F 9/445*     (2018.01)
    *G06F 9/54*     (2006.01)
    *G06F 9/455*     (2018.01)
    *G06F 9/48*     (2006.01)

(52) U.S. Cl.
    CPC ............ *G06F 9/455* (2013.01); *G06F 9/4843* (2013.01); *G06F 9/54* (2013.01)

(56) References Cited

U.S. PATENT DOCUMENTS

| | | |
|---|---|---|
| 9,106,685 B2 | 8/2015 | Lategan |
| 9,519,473 B2 | 12/2016 | Lategan |
| 2008/0022281 A1 | 1/2008 | Dubhashi et al. |
| 2008/0034194 A1* | 2/2008 | Peak ................... G06F 9/30181 712/244 |
| 2015/0277867 A1 | 10/2015 | Hasabnis et al. |
| 2015/0309980 A1* | 10/2015 | Glass ...................... G06F 9/543 715/219 |
| 2016/0055029 A1* | 2/2016 | Raman .................... G06F 9/485 718/106 |
| 2017/0004319 A1* | 1/2017 | Goldsack ............ G06F 21/6218 |

OTHER PUBLICATIONS

"Legacy Data Transfer Using Microsoft O Excel", https://help.sap.com/saphelp_erp60_sp/helpdata/en/70/93a417ecf411d296400000e82debf7/content.htm, Retrieved on: Feb. 3, 2017, 5 pages.

Harkins, Susan, "Breathe new life into a legacy Excel spreadsheet", http://www.techrepublic.com/article/breathe-new-life-into-a-legacy-excel-spreadsheet/, Published on: Mar. 10, 2014, 11 pages.

"Data Transfer Between Legacy Application and Windows Vista Driver", https://msdn.microsoft.com/en-us/windows/hardware/drivers/image/data-transfer-between-legacy-application-and-windows-vista-driver, Retrieved on: Feb. 3, 2017, 4 pages.

"International Search Report & Written Opinion Issued in PCT Application No. PCT/US2018/023210", dated Jun. 19, 2018, 12 Pages.

\* cited by examiner

ADDRESS SPACE SPLITTING FOR LEGACY APPLICATION COMPATIBILITY

BACKGROUND

Modern computing systems have progressively developed to increase the utilization of memory and processing resources. For example, many versions of operating systems have been designed to operate with "64-bit" data processing operations that use 64-bit wide data paths, memory addresses, and CPU instructions. In contrast to previous "32-bit" operating systems that were limited to a small memory address space (4 GB of memory), 64-bit operating systems are able to address a far larger memory space (e.g., terabytes or more of memory). Many operating systems such as current versions of MICROSOFT WINDOWS® allow both 32-bit applications and 64-bit applications to operate in the same environment, although only software applications that are compiled into 64-bit versions can take advantage of 64-bit processing features.

Many software applications such as office productivity software, graphics software, and the like have been ported to 64-bit versions in order to take advantage of the larger memory resources and processing instructions available in 64-bit hardware architectures. However, the use of 64-bit software processes prevents the use of 32-bit legacy extensions, plug-ins, or other components that are designed to be integrated with 32-bit versions of software processes. Consequently, many users choose to install 32-bit versions of software applications on machines capable of 64-bit processing, in order to maintain compatibility with 32-bit legacy components, despite the resource and processing limitations of 32-bit computing.

SUMMARY

Various details for the embodiments of the inventive subject matter are provided in the accompanying drawings and in the detailed description text below. It will be understood that the following section provides summarized examples of some of these embodiments.

Embodiments described herein generally relate to the execution and operation of software applications on computing systems and in particular, to the operation of heterogeneous processes of a software application that communicate data and coordinate operations based on constraints of a computing system. In an example, embodiments may include electronic operations for coordinating data processing among multiple processes of a software application, with operations that: execute a first process of the software application, such that the first process operates with a first capability that is limited to an operational constraint of the computing system; initiate a second process of the software application, such that the second process is initiated as a child of the first process, and such that the second process operates with a second capability that exceeds the operational constraint of the computing system; communicate data from the first process of the software application to the second process, such that the second process is adapted to perform data analysis operations on the data; and receive data from the second process of the software application, in response to the data being processed by the data analysis operations of the second process.

In a further example, the operational constraint of the computing system imposes a constraint for execution in a 32-bit address space, such that the first process is compiled into a 32-bit version for operation in the 32-bit address space of the computing system. For instance, the second process may be compiled into a 64-bit version for operation in a 64-bit address space of the computing system, such that the first process executes with a 32-bit instruction set of hardware of the computing system, and such that the second process executes with a 64-bit instruction set of the hardware of the computing system.

Also in a further example, the operational constraint of the computing system is enforced at least in part from a user-defined parameter, such that the user-defined parameter indicates an architectural parameter from among available hardware or software capabilities of the computing system. For instance, the operational constraint may relate to at least one of bitwise compatibility, a version of an operating system, a compatibility mode within an operating system, a version of the software application, a hardware architecture, a version of a hardware component of the computing system, availability of a data provider for a hardware architecture of the computing system, or an operational user preference Also in a further example, initiating and executing an extension component within the first process of the software application, such that the extension component operates with the first capability that is limited to the operational constraint of the computing system. For instance, the extension component may be a plug-in or a Component Object Model (COM) add-in of the software application, such that the extension component is executable to perform data processing operations in the software application. Also for instance, the operational constraint may provide a constraint for execution of the process as a 32-bit version in a 32-bit address space of the computing system.

An embodiment discussed herein includes a computing device including processing hardware (e.g., a processor) and memory hardware (e.g., a storage device or volatile memory) including instructions embodied thereon, such that the instructions, which when executed by the processing hardware, cause the computing device to implement, perform, or coordinate the electronic operations. Another embodiment discussed herein includes a computer program product, such as may be embodied by a machine-readable medium or other storage device, which provides the instructions to implement, perform, or coordinate the electronic operations. Another embodiment discussed herein includes a method operable on processing hardware of the computing device, to implement, perform, or coordinate the electronic operations.

As discussed herein, the logic, commands, or instructions that implement aspects of the electronic operations described above, may be provided in a local computing system or a remote computing system, including any number of form factors for the computing system such as desktop or notebook personal computers, mobile devices such as tablets, netbooks, and smartphones, client terminals and server-hosted machine instances, and the like. Another embodiment discussed herein includes the incorporation of the techniques discussed herein into other forms, including into other forms of programmed logic, hardware configurations, or specialized components or modules, including an apparatus with respective means to perform the functions of such techniques. The respective algorithms used to implement the functions of such techniques may include a sequence of some or all of the electronic operations described above, or other aspects depicted in the accompanying drawings and detailed description below.

This summary section is provided to introduce aspects of the inventive subject matter in a simplified form, with further explanation of the inventive subject matter following in the text of the detailed description. This summary section is not intended to identify essential or required features of the claimed subject matter, and the particular combination and order of elements listed this summary section is not intended to provide limitation to the elements of the claimed subject matter.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
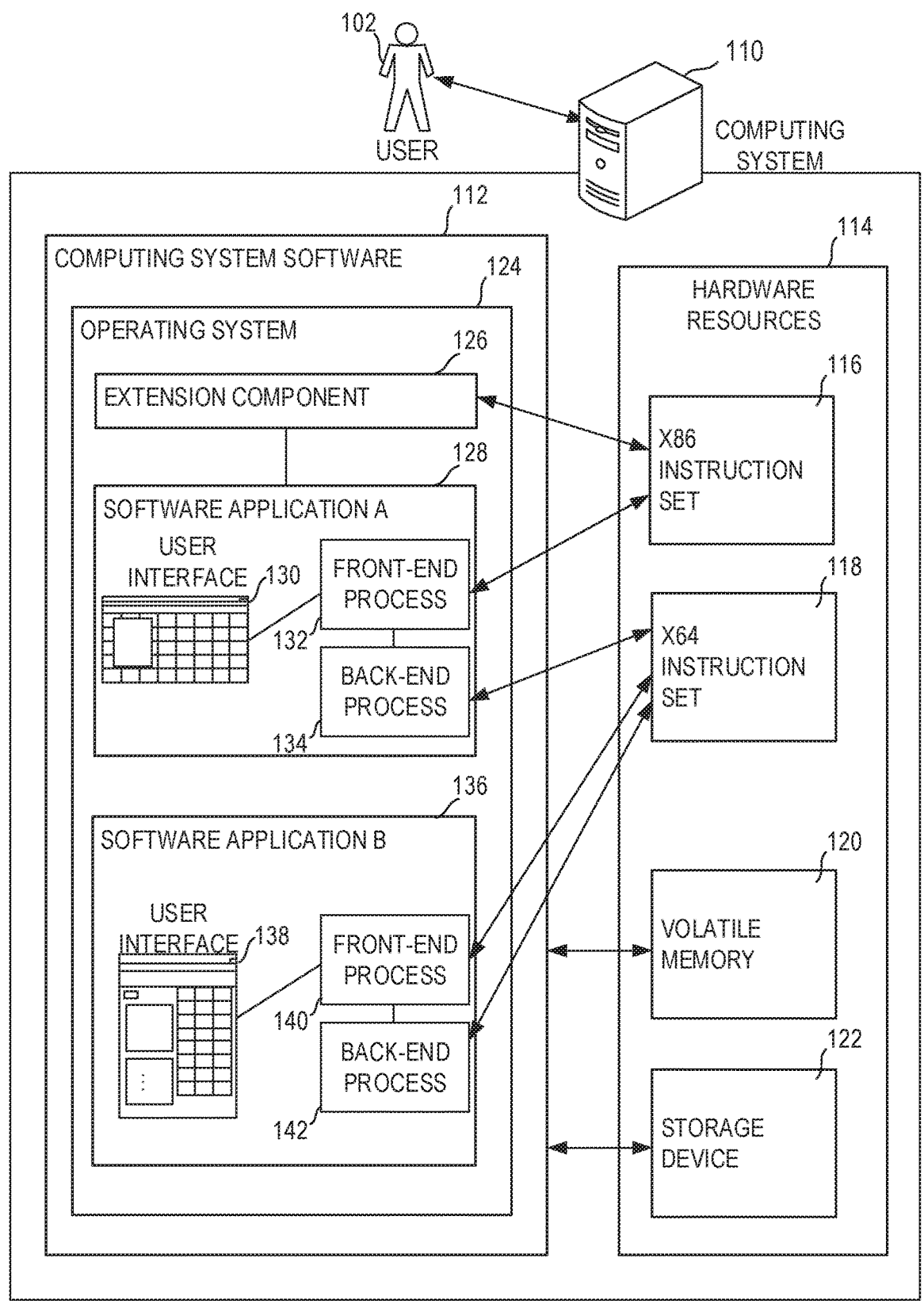
FIG. 1 illustrates a scenario for operation of respective software applications in a computing system, according to an example.

In the following description, methods, configurations, and related apparatuses are disclosed for the deployment of multiple software processes as part of a software application, to enable compatibility with multiple architectures, platforms, or hardware and system constraints. These techniques may be used, for example, by a software application that utilizes legacy components (e.g., extensions, plug-ins, components) and processes designed for a first architecture or environment while also invoking and utilizing processes designed for a second architecture or environment. In particular, the configuration described herein may enable the execution of multiple processes of different architectures within the scope of a single software application, even as the software application from a user's point of view still appears to operate as a single entity. The presently disclosed techniques and configurations may be used, for example, to comply with the compatibility requirements or hardware capabilities of a first set of processes, while allowing a second set of processes to comply with compatibility requirements and hardware capabilities.

As discussed in the following examples, the techniques for invoking processes among multiple architectures may include specific applicability to 32-bit and 64-bit software applications, and the use of address space splitting to control and coordinate operations among different processes. As also discussed in the following examples, the invocation of multi-architecture components may result from user-provided input and preferences, or from the optimization of an operating environment to determine an optimized combination of process operations and architecture compatibility.

The techniques described herein may be applicable to user-facing software involving multiple processing subsystems such as office productivity software (e.g., word processors, spreadsheets, presentation, note taking applications), web browsers, graphic and multimedia design suites, enterprise software applications, and the like. As a non-limiting example, many existing (legacy) spreadsheet extensions are compiled for use with a spreadsheet software application (e.g., MICROSOFT EXCEL®) executing on a 32-bit software and hardware platform. Operation of all spreadsheet functions in a 32-bit address space will impose technical limits on the amount of memory that the spreadsheet software application can use, because the 32-bit platform is theoretically limited to 4 GB maximum of address space (which is often a far smaller virtual address space). Modern data analysis techniques that are executed in some processes of the software application, however, may involve a large amount of memory (multiple gigabytes) to effectively process the data. This results in a loss of functionality in some aspect, because a user must choose to forego 64-bit operations with modern data analysis features, or choose to avoid use of legacy tools such as COM components and plug-ins that are only designed for 32-bit operation.

As discussed in the following, one example implementation includes splitting and coordinating functions of software application (e.g., a spreadsheet software application such as EXCEL®) into two processing domains. One domain operates at least one 32-bit process to interact with legacy 32-bit extensions, while another domain operates at least one 64-bit process to perform data analysis and other 64-bit operations. This implementation maximizes use of system resources, despite architectural differences or limitations with the front-end processes. Further, although the front-end process of a software application (e.g., an office productivity software application such as EXCEL®) may present a user interface with 32-bit and legacy extension compatibility, any invoked back-end data analysis process may perform 64-bit processing to enable optimal efficiency, speed, and data operations.

As discussed herein, the techniques discussed may be applicable for splitting and coordinating functions based on hardware capabilities (e.g., 32-bit "x86" versus 64-bit "x64" architectures and instructions, memory addressing constraints), software capabilities (e.g., different operating systems, different types of data providers, or different types of execution runtimes), or like software/hardware architectural differences. As further discussed herein, the determination of executable processes and the division of processing for a particular application or task may consider various user-configurable preferences in addition to system capabilities and configuration settings.

FIG. 1 provides an overview of an example scenario for operation of respective software applications in a computing system. In this scenario, a computing system 110 operated by a user 102 includes hardware resources 114 and various computing system software 112 that executes on the hardware resources 114. For example, the computing system software 112 may execute with a processor (not shown) invoking an x86, 32-bit instruction set 116 and an x64, 64-bit instruction set 118; the computing system software 112 may further be executed and stored through use of volatile memory 120 (e.g., random access memory) and a storage device 122 (e.g., a non-volatile memory or hard disk).

The computing system software 112 provides a hierarchy that includes an operating system 124, a first software application 128, and a second software application 136. The first software application 128 provides a user interface 130 and other functionality through execution of a front-end process 132; and the first software application 128 performs additional operations such as data analysis operations through a back-end process 134.

In the example depicted in FIG. 1, the front-end process 132 is a 32-bit process that executes in a 32-bit address space with use of an x86 instruction set 116. The back-end process 134 is a separate 64-bit process, spawned as a child process of the front-end process 132, that executes in a 64-bit address space with use of an x64 instruction set 118. In an example, the 64-bit child back-end process is spun up on demand, if and only when there is a need for the child process. For instance, data/memory intensive operations can be offloaded to the 64-bit back-end process while the user interface and data authoring manipulation portions of the software application can operate in the 32-bit front-end process.

In an example applicable to a WINDOWS® operating system environment, both the parent process (the 32-bit front-end process 132 of the first software application 128, for example) and the child process (the 64-bit back-end process 134 that runs a processing engine, for example) are managed through the use of job objects. Job objects are namable, securable, sharable objects that control attributes of the processes associated with them, and operations performed on a job object affect all processes associated with the job object. The use of job objects allows management of the parent-child processes a unit, which may be used for setting limits such as working set size or terminating all processes associated with the job.

The first software application 128 is further integrated with the use of an extension component 126, such as a COM component, plug-in, or the like, that integrates into use with the first software application 128 through the front-end process 132. The extension component in turn executes in the 32-bit address space through use of the x86 instruction set 116. As an example, the extension component is executed as part of the front-end process 132, rather than a separate process.

As a result of operating the front-end process 132 and the back-end process 134 separately, the back-end process 134 may operate in the 64-bit address space while the front-end process 132 may continue to operate in the 32-bit address space. Thus, the first software application 128 may include heterogeneous processes of varying bitwise compatibility. In contrast to this hybrid configuration, the second software application 136 illustrated in FIG. 1 includes a similar user interface 138, a front-end process 140, and a back-end process 142, with each of the processes operating with the same bitwise compatibility, through use of the x64 instruction set 116. For example, if the operating system 124 determines that support for 32-bit processes and execution modes are not needed (e.g., because no support for legacy extension components is needed), then the front-end process 140 and the back-end process 142 may be both executed in 64-bit mode. This determination and configuration of the mode or version of a software application process may occur during installation, configuration, or at a later usage event.

Figure 2:
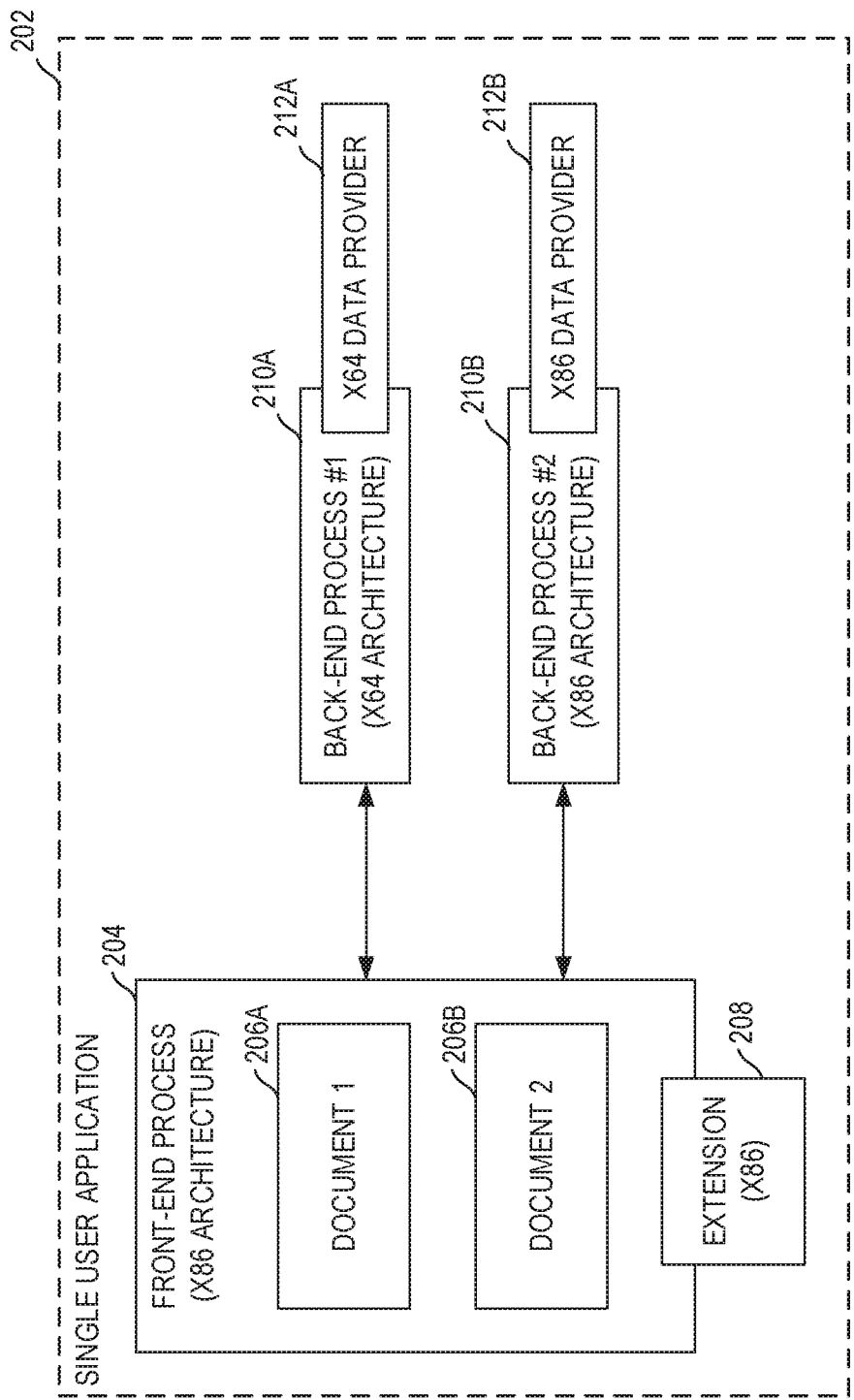
FIG. 2 illustrates a block diagram illustrating operations of processes within a software application, according to an example.

FIG. 2 illustrates a block diagram illustrating example operations of processes within a software application 202. As shown, the block diagram for the software application 202 includes use of a front-end process 204, operating on an x86 architecture. For example, the software application 202 may be a 32-bit version of an office productivity application, executing with features of an x86 hardware architecture, and with the office productivity application being configured to generate and edit a document (e.g., a word processing document, a spreadsheet document, a presentation document, etc.). As also shown, the front-end process 204 performs operations on data files including a first document 206A and a second document 206B. Although not shown, other types and forms of documents and data sources may also be incorporated, edited, viewed, and controlled within the front-end process 204.

As shown in FIG. 2, the software application 202 includes integration with an extension component 208. The extension component 208 may be a 32-bit version of an office productivity add-in, which includes features for execution in an x86 hardware architecture. Such an office productivity add-in integrates with the execution of the front-end process 204 for the office productivity application, with the add-in being configured to perform certain operations (e.g., data processing, formatting, enhancement) in the document (e.g., a word processing document, a spreadsheet document, a presentation document, etc.) or in the front-end process 204. For example, the extension component 208 may be a 32-bit version of a Component Object Model (COM) add-in, which is executed by the front-end process 204 in a 32-bit address space of the computing system. Because the extension component 208 provides extension functionality in the same format (and operates in the same 32-bit address space) as the front-end process 204, the front-end process 204 and the extension component 208 may be successfully integrated with one another.

As also shown in FIG. 2, the software application 202 further includes multiple back-end processes, a first back-end process 210A and a second back-end process 210B. In an example, the front-end process 204 is adapted to initiate and control the execution of the back-end processes 210A. 210B, as respective child processes of the front-end process 204. For example, the front-end process 204 may spawn (e.g., on WINDOWS® systems) or fork (e.g., on Linux systems) the respective back-end process, and operate the respective back-end process under the control of the parent, front-end process 204. The front-end process 204 operates separately from the back-end processes 210A, 210B, using a communication mechanism (e.g., interprocess communication (IPC) such as pipes, shared memory, signals, queues, sockets, and the like) to communicate data. In a further example discussed below, the back-end process may also be executed on a remote computing system, with a use of a remote communication protocol to obtain and capture data from a remote back-end process.

In an example, the respective back-end process that is spawned may be selected based on at least one operational constraint of the computing system. For example, the operational constraint may relate to at least one of: bitwise compatibility (e.g., whether the software component is a 32-bit process that is not compatible for direct integration with a 64-bit process), a version of an operating system, a compatibility mode within an operating system, a version of the software application, a hardware architecture e.g., hardware capabilities in the computing system to execute certain instructions or perform certain operational actions), a version of a hardware component of the computing system, availability of a data provider for a hardware architecture of the computing system (e.g., a data provider that is only available in 32-bit mode), or an operational user preference.

In a further example, an operational user preference (e.g., to select a 32-bit mode of operation) may be established from administrator policies, feature or function limitations, or the like, such as to ensure compatibility with certain back-end processes or process functions.

As shown, the first back-end process 210A operates as a child process, but in a 64-bit mode of operation, the first back-end process 210A executes with features of an x64 hardware architecture. In this fashion, the first back-end process 210A may operate in a 64-bit address space, yet is separated from the front-end process 204 to allow the front-end process 204 (and the extension component 208) to maintain operation with an x32 hardware architecture in a 32-bit address space. This allows use of the extension component 208 in the software application 202 in a first address space, because the use of the first back-end process in a 64-bit address space is separated in a way to not cause a conflict. Even further, the second back-end process 210B may operate with features of another or the same hardware architecture (as shown, operating with an x86 hardware architecture in a 32-bit address space). The use of such heterogeneous back-end processes may be useful for further operations, such as in the example where the back-end process 210B is integrated with a second data provider 212B limited to an operational constraint (e.g., operating with an x86 hardware architecture in a 32-bit address space), whereas the back-end process 210A is integrated with a first data provider 212A that is not limited to a first constraint (e.g., operating with an x64 hardware architecture in a 64-bit address space).

Although only a front-end and a back-end process are shown, it will be understood that multiple levels of processes may be propagated and controlled through use of child processes. For example, a series of child processes may be created in the manner of a graph, such as with a first portion of the graph spawning child processes compliant with a first constraint (e.g., 32-bit operation), and a second portion of the graph spawning child processes that are not limited to a first constraint, or are limited to a second constraint (e.g., 64-bit operation).

Figure 3:
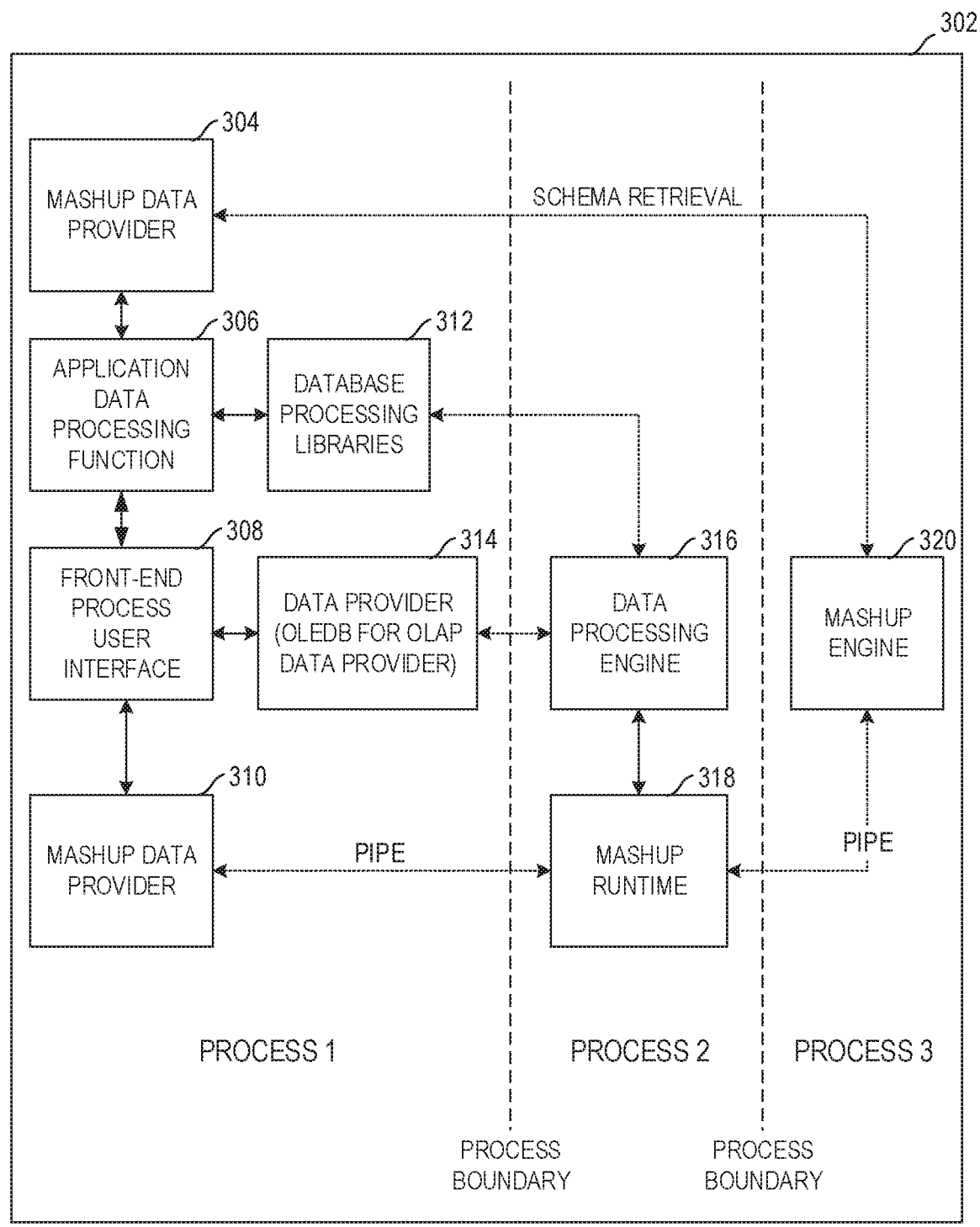
FIG. 3 illustrates an operational diagram illustrating data communications among components within respective processes, according to an example.

FIG. 3 illustrates an operational diagram 302 illustrating example data communications among components within respective processes. As shown in the operational diagram 302, a first process (Process 1), second process (Process 2) and third process (Process 3) each coordinate data actions for use in an office productivity software application. The second process (Process 2) is a child process of the first process (Process 1), and the third process (Process 3) is in turn a child process of the second process (Process 2). Due to the separation of processes, shown by respective process boundaries, the operational constraints and functionality (e.g., hardware or software capabilities, such as 32-bit vs. 64-bit) of the processes may be operated in any combination.

As a non-limiting illustration, the first process operates a user interface 308, a 32-bit COM data provider 314 (e.g., an extension component, such as an OLEDB application programming interface (API) for an OLAP data provider), a data processing function 306, a set of database processing libraries 312, a first mashup data provider 304, and a second mashup data provider 310. The first process accordingly may expose features for data processing, in this case for the query, selection, compilation, and presentation of a mashup (e.g., data mashup or data preparation).

The operational diagram 302 depicts the use of a data processing engine 316 and a mashup runtime 318 in a second process, which for example may operate as a 64-bit process for enhanced data processing capabilities (in a larger memory space). The third process in turn may be configured as a child process of the second process, with the third process including a mashup engine 320, and for example the third process may operate as a 32-bit process. The operational diagram 302 further shows integration and communication between the operational components of the first, second, and third processes, such as through the use of pipes, data retrieval, API calls, and it will be evident that any number of other data operations and communications may be coordinated in such examples.

Figure 4:
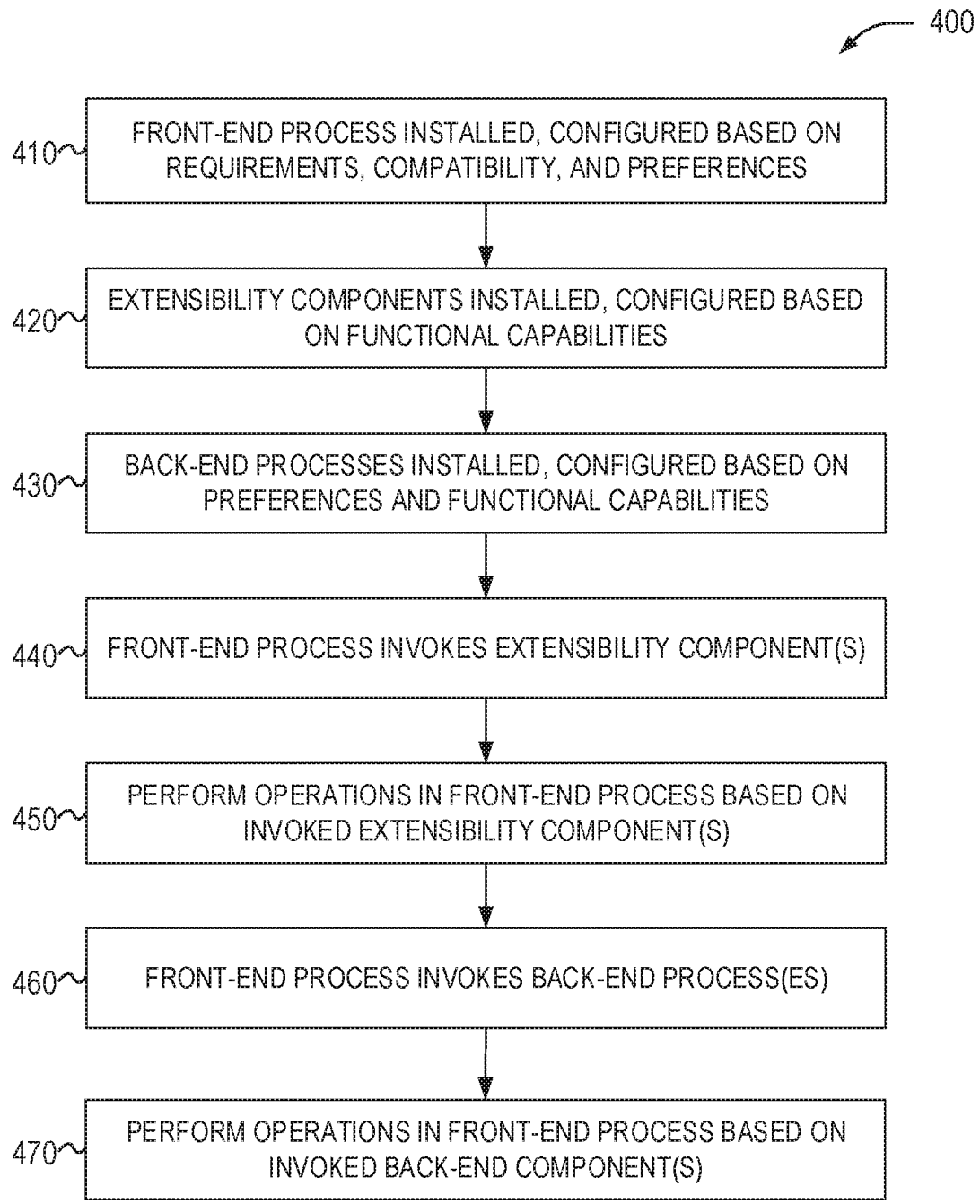
FIG. 4 illustrates a flowchart of example operations for configuration and communications among respective processes, according to an example.

FIG. 4 illustrates a flowchart 400 of example operations for configuration and communications among respective processes. The operations depicted in the flowchart 400 are depicted from the perspective of a software application on a local machine that includes a front-end process (a parent process), an extensibility component that integrates with the front-end process, and one or more back-end processes (child processes). The operations performed by these components may occur to address any number of the operational constraints of the local computing system or the software application.

As shown, the operations of flowchart 400 begin with the installation and configuration of a front-end process (operation 410), to meet one or more operational constraints, in this manner, the front-end process may be installed and configured based on requirements (e.g., hardware processing requirements, software prerequisites), compatibility (e.g., compatibility with other software applications, compatibility with hardware), and preferences (e.g., user policies). For example, a 32-bit version of a front-end process may be selected automatically (by an operating system, by a software application) or by a user (manually, or based on user preferences) based on desired compatibility with known 32-bit extensibility components or back-end processes, because a 64-bit version of the front-end process cannot be executed in this manner.

Additional operations of the flowchart 400 include: installation and configuration of one or more extensibility components of the software application, for operation within the front-end process, based on the capabilities of the computing system (operation 420); and installation and configuration of one or more back-end processes of the software application, for communication with the front-end process (operation 430). In an example, the back-end processes are installed and configured based on the capabilities of the computing system, which may include consideration of the requirements, compatibility, and preferences also used for the front-end process.

The operation of the software component, as depicted in the flowchart 400, includes the execution of the front-end process and the invoking of one or more extensibility components (operation 440). In an example, the front-end process performs operations (e.g., data modification operations, user interface operations, etc.) based on the features of the invoked one or more extensibility components (operation 450). As discussed in the examples above, this may include the execution of the front-end process and the extensibility components as a 32-bit process in a 32-bit address space. In another example, a first architectural parameter for execution of the front-end process and the extensibility components are indicated from among available hardware or software capabilities of the computing system.

Finally, the operations of the flowchart 400 conclude with the front-end process invoking one or more back-end processes (operation 460), such as spawning the one or more back-end processes as child process(es), and the performance of operations in the front-end process based data or other actions received from the invoked back-end components (operation 470). In an example, a second architectural parameter for execution of the front-end process and the extensibility components are indicated from among the available hardware or software capabilities of the computing system. In a further example, the first architectural parameter is limited to a particular operational constraint of the computing system, whereas the second architectural parameter is not limited or exceeds this operational constraint.

Figure 5:
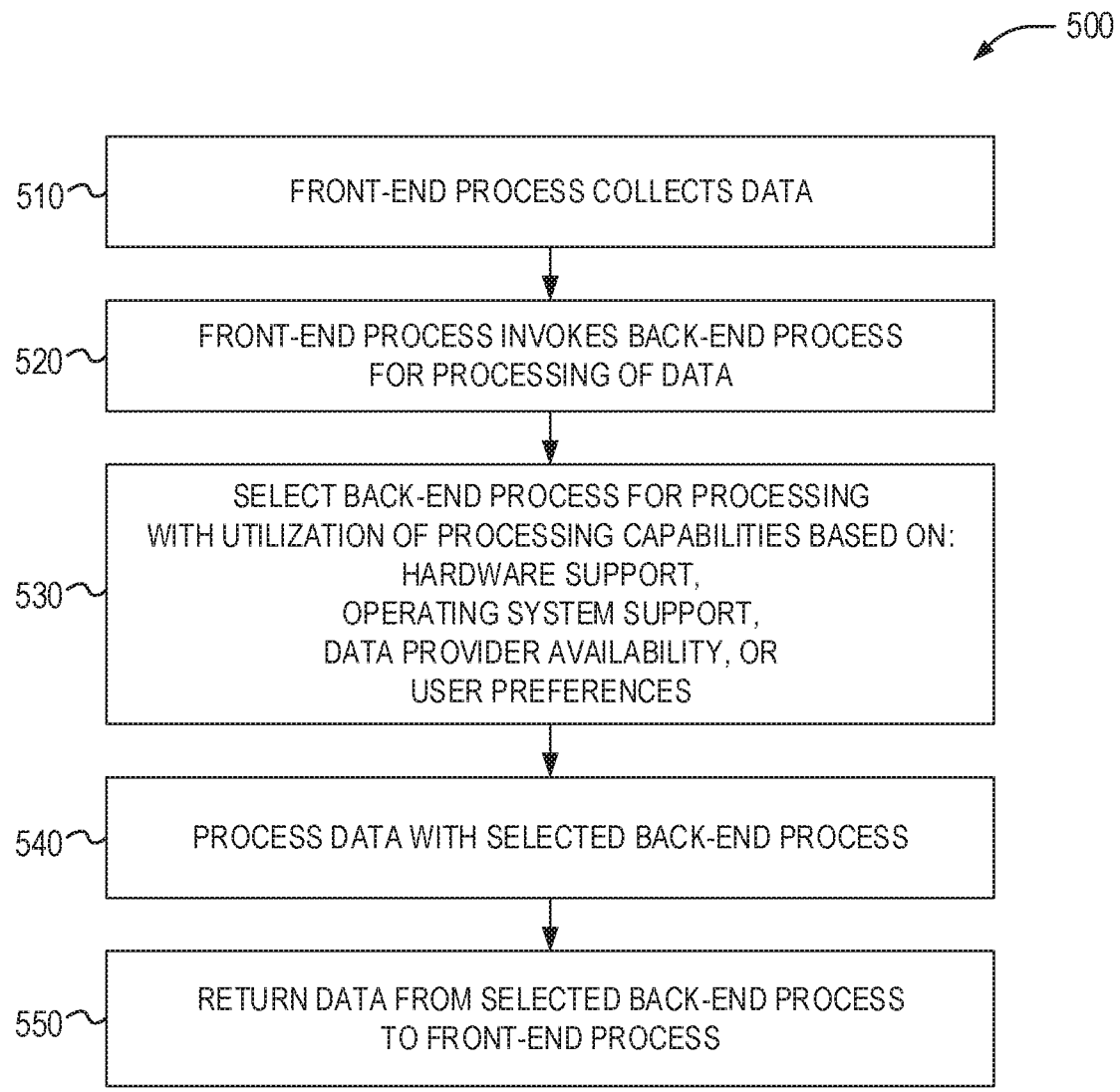
FIG. 5 illustrates a flowchart of example operations for invocation of a selected back-end process, according to an example.

FIG. 5 illustrates a flowchart 500 of example operations for invocation and operation of a selected back-end process (e.g., a "second" process). The actions implemented from the operations of the flowchart 500 may include the following sequence, although it will be evident that other variations to the order and length of the sequence may be provided.

First, the flowchart 500 depicts the collection of data in a front-end process (e.g., first and parent process) of the software application (operation 510). This collection of data may include querying and retrieving data from various data sources, the collection of user inputs, and the presentation and operation of respective user interface features to interact, capture, filter, refine, select, and display data fields and values. The front-end process operates to invoke a back-end process, with the back-end processing being invoked to perform data analysis operations on at least a subset of the data being used in the front-end process (operation 520). In an example, back-end process is initiated (e.g., launched, started, etc.) as a child of the front-end process, such that the operation of the process continues within the software application.

The selection of the particular back-end process used to perform the data analysis operations may be customized and determined according to one or more applicable values for processing capabilities (operation 530). For example, a back-end process may include a first version and a second version that is selected based on the particular processing capabilities available in the computing system, and the type of data analysis operations needed to be performed with the back-end process. The processing capabilities available in the computing system may be evaluated based on: hardware support for the particular version of the back-end process (e.g., type of hardware architecture and instructions used to execute the back-end process), operating system support for the particular version of the back-end process (e.g., whether supported by particular version or type of operating system), data provider availability the particular version of the back-end process (e.g., whether data must be retrieved via an older, 32-bit data source), or user preferences (e.g., whether an end user, administrator, or other preference is set to choose a particular version of the back-end process). For example, the first version of the back-end process may be compiled for use with a particular hardware architecture (e.g., x86, x64, or ARM), software platform (e.g., Windows®, Linux, MacOS®), or operational constraint.

The operations of the flowchart 500 conclude with the processing of the data with the selected back-end process (operation 540) and the returning (e.g., the communication, retrieval, or transmission) of the data from the selected back-end process to the front-end process (operation 550). The data returned from the selected back-end process may be further refined and output (e.g., presented, transmitted, processed) by the first-end process, including with operation of the extensibility components described above for FIG. 4.

Figure 6:
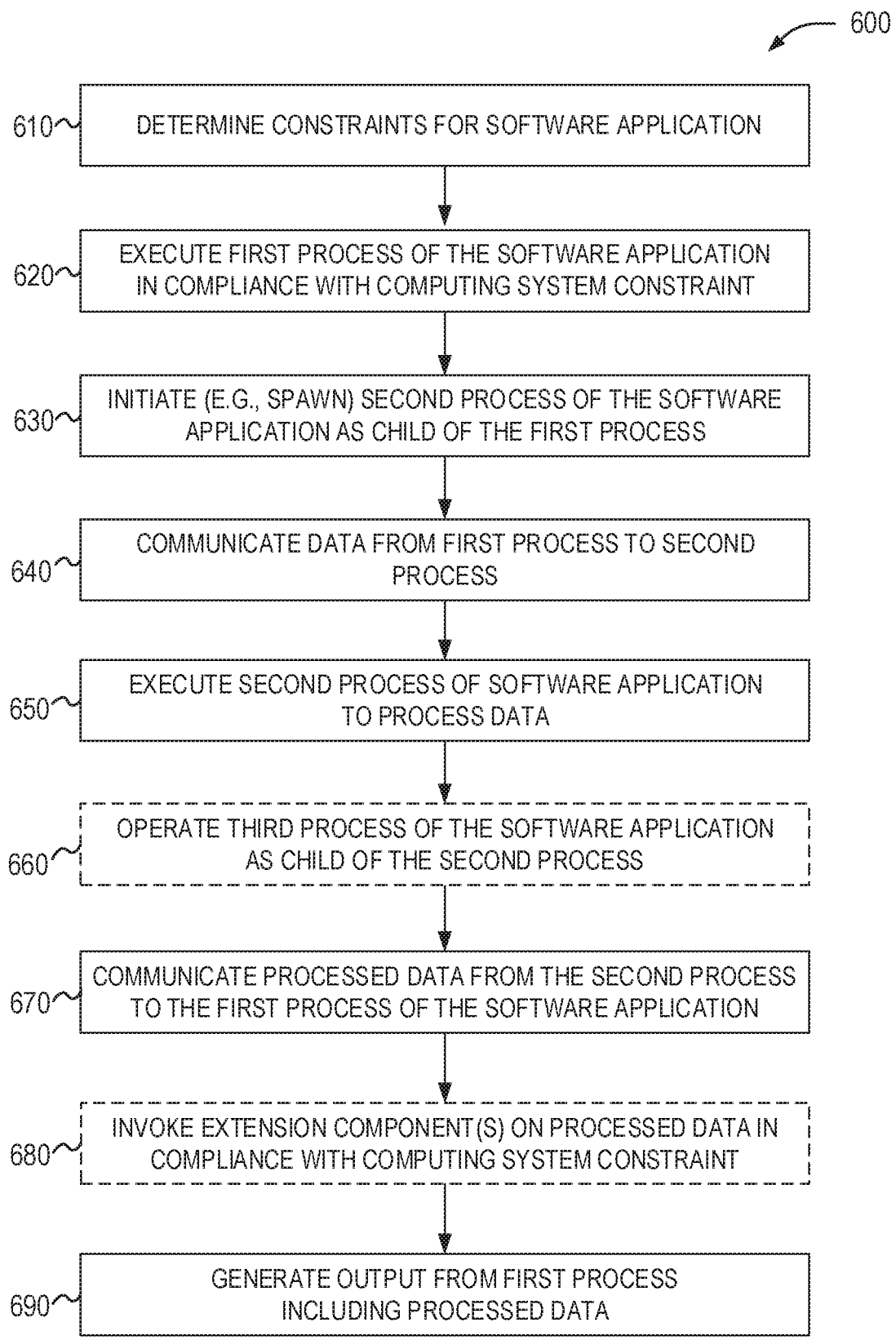
FIG. 6 illustrates a flowchart of example operations for coordinating data processing among multiple processes of a software application, according to an example.

FIG. 6 illustrates a flowchart. 600 of example operations for coordinating data processing among multiple processes of a software application, according to an example. It will be understood that the operations of the flowchart 600 may be implemented in connection with a computer-implemented method, instructions on a computer program product, or on a configuration of a computing device (or among multiple of such methods, products, or computing devices). In an example, the electronic operations are performed by a computing device that operates all processes of the software application (a first process, second process, third process, etc.) within a single computing system; in another example, operations of the first process are performed within a local computing device that hosts a user interface, and operations of the second process are performed within a remote computing system that hosts remote processing capabilities.

The flowchart 600 depicts operations to perform execution of the software application, which may commence with the determination of operational constraints for a software application (operation 610). In an example, the operational constraints relate to at least one of: bitwise compatibility, a version of an operating system, a compatibility mode within an operating system, a version of the software application, a hardware architecture, a version of a hardware component of the computing system, availability of a data provider for a hardware architecture of the computing system, or an operational user preference.

The flowchart operations continue with the execution of a first (e.g., front-end) process of the software application (operation 620), with the execution being in compliance with a specific operational constraint of the computing system. In an example, the first process operates to comply with a first capability that is limited to the specific operational constraint of the computing system. In a further example, this specific operational constraint of the computing system is enforced at least in part from a user-defined parameter, such that the user-defined parameter indicates an architectural parameter from among available hardware or software capabilities of the computing system. Also in a further example, this specific operational constraint of the computing system may be automatically determined from available functional features of the computing system and available architectural parameters.

The flowchart operations continue to utilize the first process of the software application to initiate (e.g., spawn, fork) a second process of the software application, as a child process (e.g., a subprocess or subtask) (operation 630). In an example, the second process operates with a second capability that exceeds the operational constraint of the computing system. In a further example, the first process includes a function limited by the operational constraint but the second process includes a function that is not limited by the operational constraint, such that the respective functions are not compatible for execution with each other within a common process.

The first process and second process further operate to communicate specific data from the first process of the software application to the second process (operation 640), to process data (e.g., perform data analysis operations on the specific data). For example, the specific data may include user-created data created or accessed through a user interface of the first process. Additionally, executable code of the first process of the software application may be compiled into a different version than the executable code of the second process based on the operational constraint or system capability. In a further example, the first process of the software application (of a first version or type of process) is operated in a compatibility mode within the operating system of the computing system, and the second process of the software application (of a second version or type of process)

is operated in a non-compatibility mode within the operating system of the computing system.

The flowchart operations continue with execution of the second process of the software application to process data (operation 650). In a first example, the second process executes on the computing system, and performs the data analysis operations on the data provided from the first process, such that the execution of the second process with the second capability utilizes additional resources of the computing system that are not available with the first capability. In this example where the second process executes on the computing system, the communication of data between the first process and the second process may occur via an interprocess communication mechanism within the computing system. In a second example, the first process executes on the computing system, but the second process executes on a remote computing system, and the communication of data between the first process and the second process occurs via a network communication protocol. In a further optional example, the second process may further initiate (e.g., launch, start, etc.) a third process of the software application (operation 660), on the local computing system or the remote computing system, such that the third process is initiated as a child process operating under the second process of the software application.

The flowchart operations continue to communicate processed data from the second process to the first process of the software application (operation 670), such as with the transmission and receipt of the data from the second process to the first process of the software application (e.g., via interprocess communication methods, remote network communications, etc.). In a specific example, the operational constraint of the computing system includes operation in a 32-bit address space or a 64-bit address space of the computing system, such that the first process is compiled into a 32-bit version for operation in the 32-bit address space of the computing system, and such that the second process is compiled into a 64-bit version for operation in the 64-bit address space of the computing system. In a further specific example, the first process is a front-end process that provides a user interface, where the second process is a back-end process that provides a data processing function, such that the first process executes with a 32-bit instruction set of hardware of the computing system, and such that the second process executes with a 64-bit instruction set of the hardware of the computing system.

In a further optional example, one or more extension components are invoked on processed data (operation 680) (e.g., the data received at the first process), as the extension components are invoked and executed in compliance with the computing system constraint. For example, the computing system may initiate and execute an extension process of the software application to invoke an extension component, with the extension process operates with the first capability that is limited to the operational constraint, and where the extension process is initiated as a child of the first process. In a specific example, the extension process is executable as a plug-in or a Component Object Model (COM) add-in of the software application, and the extension process is executable to perform data processing operations in the software application. Also in a specific example, an operational constraint applicable to the extension component may include execution as a 32-bit version for operation in a 32-bit address space of the computing system.

The flowchart operations conclude with the generation of output from the first process of the software application, with the output including the data processed and received from the data analysis operations of the second process (operation 690). For example, the data processed by the second process may be output in a user interface hosted and controlled by the first process.

Although many of the examples provided above specifically refer to the use of 32-bit and 64-bit software instructions, on x86 and x64 hardware configurations, it will be understood that the techniques discussed herein may be adapted to a variety of other hardware, software, and other constraints of a computing system. Further, other techniques may be used for coordination and communication among multiple processes of a software application beyond those expressly discussed above.

Figure 7:
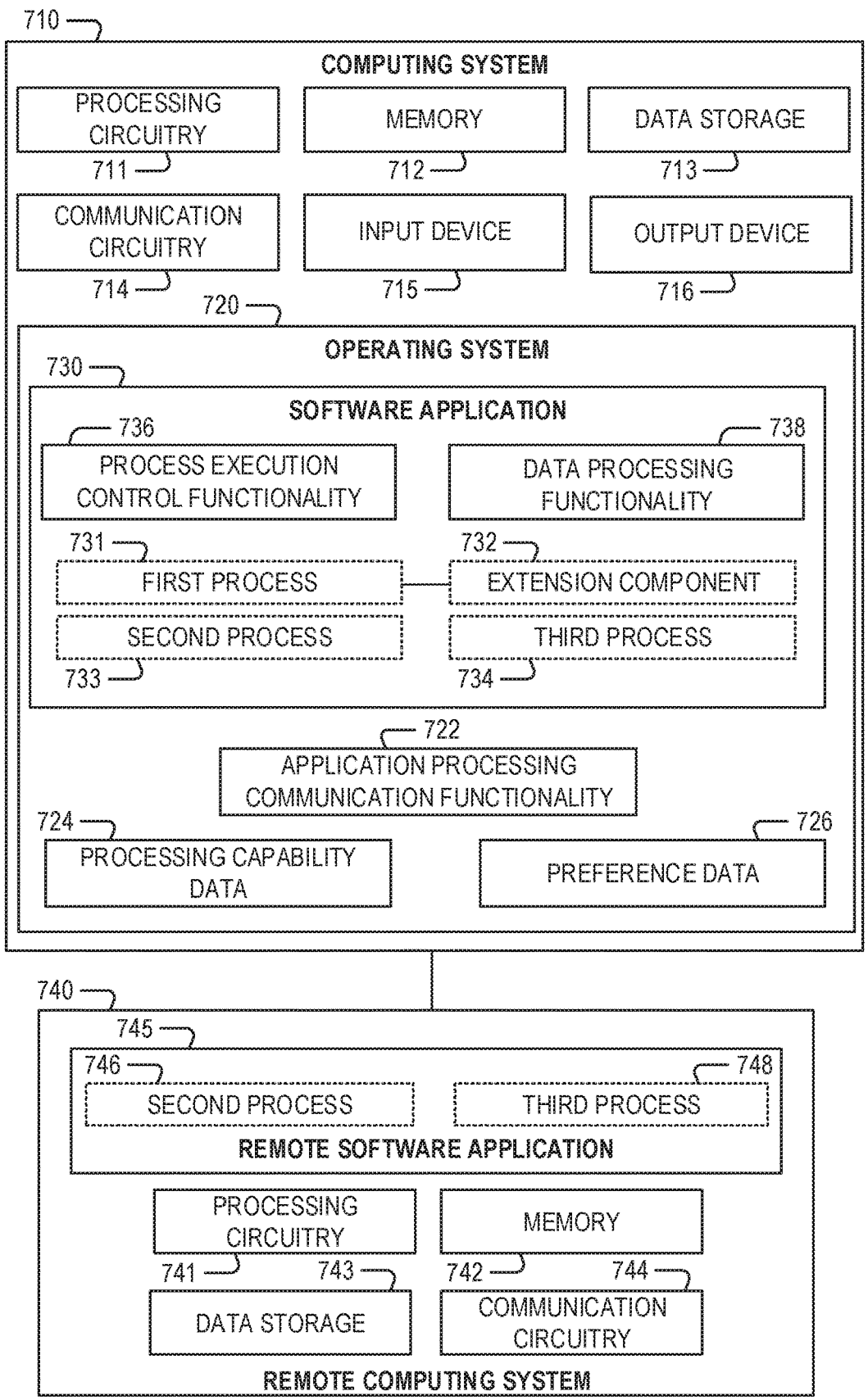
FIG. 7 illustrates a block diagram of hardware and functional components of a computing system to implement operations that coordinate data processing among multiple processes of a software application, according to an example.

FIG. 7 illustrates a block diagram of hardware and functional components of an example computing system 710 to implement operations that coordinate data processing among multiple processes of a software application, such as are accomplished with the examples described above. The example operations of the flowcharts 400, 500, 600, for example may be performed at or among a local (e.g., client) or remote (e.g., server) computing device, and distributed component examples of the same. In an example, the software application is adapted to execute exclusively on a single computing device (e.g., computing system 710) with use of a processor and a memory device, with operation of respective processes as discussed herein. In a further example, the software application is adapted to execute some of the processes on a local computing device (e.g., computing system 710), with additional data and processing of one or more child processes performed at a remote computing device (e.g., remote computing system 740).

FIG. 7 more specifically illustrates selected hardware and functional components of a computing system 710 and a remote computing system 740 to implement operations for coordinating data processing among multiple processes of a software application. It will be understood, that although certain hardware and functional components are depicted in FIG. 7 and in other drawings as separate systems or services, the features of certain of the components may be integrated into a single service or subsystem. Further, although only one local computing system and one remote computing system is configured, it will be understood that the features of these systems may be distributed in some settings among one or multiple computing systems (including in cloud-based processing settings).

As shown, the computing system 710 includes processing circuitry 711 (e.g., a CPU) and a memory 712 (e.g., volatile or non-volatile memory) used to perform electronic operations (e.g., via instructions) for executing multiple processes of a software application and coordinating data among such multiple processes of the software application in accordance with operational constraints (e.g., to implement the techniques depicted in FIGS. 1-6), specifically for the execution of an operating system 720 and a subject software application 730; data storage 713 to store commands, instructions, and other data for operation and execution of the operating system 720 and the subject software application 730; communication circuitry 714 to communicate with an external network or devices (e.g., the remote computing system) via wired or wireless networking components for operation of the operating system 720 or the subject software application 730; an input device 715 (e.g., an alphanumeric, point-based, tactile, audio input device) to receive input (e.g., control commands) from a human user for the operating system 720 or the subject software application 730; and an output device 716 (e.g., visual, acoustic, haptic output device) to provide output (e.g., visual, acoustic, haptic output) to the human user from the operating system 720 or the subject software application 730.

In an example, the computing system 710 and the operating system 720 is adapted to execute the subject software application 730, through processing components or functionality (e.g., circuitry or software instructions), such as process execution control functionality 736 used to operate and control processes within the subject software application; and data processing functionality 738 used to exchange and handle data processing actions within the subject software application. The subject software application 730 further includes operation of respective processes and components to perform these processing actions, these include the use of a first process 731, an extension component 732, a second process 733, and a third process 734. These processes and component 731, 732, 733, 734 are further indicated as being executed on demand by the software application functionality.

In an example, the computing system 710 is adapted to include further processing functionality for coordinated data processing among multiple processes of the subject software application, through respective features including: application processing communication functionality 722 (e.g., circuitry or software instructions) used to process data communications among the processes 731, 733, 734; processing capability data 724 (e.g., a database or data store) used to store and provide information for: the operational or functional capabilities of the computing system 710, the operating system 720, or the software application 730; and preference data 726 (e.g., a database or data store) used to store and provide information for user preferences (e.g., policies, settings, specifications) for execution of respective processes or components (and versions of such processes or components) in the subject software application. In a further example, the application processing communication functionality may perform communications with remote processes 746, 748 as follows.

As shown, the remote computing system 740 includes processing circuitry 741 (e.g., a CPU) and a memory 742 (e.g., volatile or non-volatile memory) used to perform electronic operations (e.g., via instructions) for execution of remote child processes of the subject software application via a remote software application component 745; data storage 743 to store commands, instructions, and other data for operation and use of the remote child processes of the subject software application; and communication circuitry 744 to communicate with an external network or devices via wired or wireless networking components for communicating operational control and data for use with the remote child processes of the subject software application. In an example, the remote computing system 740 is adapted to coordinate the execution of one or more child processes, such as the second process 746 (a child of the first process 731) and a third process 748 (a child of the second process 746 or the second process 733), with the data from such child processes being returned to a parent process in the software application 730. Other aspects of remote processing may be performed by the remote computing system 740 to implement the techniques discussed herein in a remote system-coordinated environment.

As referenced above, the embodiments of the presently described electronic operations may be provided in machine or device (e.g., apparatus), method (e.g., process or computer- or machine-readable medium (e.g., article of manufacture or apparatus) forms. For example, embodiments may be implemented as instructions stored on a machine-readable storage medium, which may be read and executed by a processor to perform the operations described herein. A machine-readable medium may include any non-transitory mechanism for storing information in a form readable by a machine (e.g., a computer). A machine-readable medium may include a single medium or multiple media (e.g., a centralized or distributed database, and/or associated caches and servers) that store the one or more instructions.

A machine-readable medium may include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. A machine-readable medium shall be understood to include, but not be limited to, solid-state memories, optical and magnetic media, and other forms of storage devices. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and optical disks. The instructions may further be transmitted or received over a communications network using a transmission medium (e.g., via a network interface device utilizing any one of a number of transfer protocols.

Although the present examples refer to various forms of cloud services and infrastructure service networks, it will be understood that may respective services, systems, and devices may be communicatively coupled via various types of communication networks. Examples of communication networks include a local area network (LAN), a wide area network (WAN), the Internet, mobile telephone networks, plain old telephone (POTS) networks, and wireless data networks (e.g., Wi-Fi, 2G/3G, and 4G LTE/LTE-A, or other personal area, local area, or wide area networks).

Embodiments used to facilitate and perform the electronic operations described herein may be implemented in one or a combination of hardware, firmware, and software. The functional units or capabilities described in this specification may have been referred to or labeled as components, processing functions, or modules, in order to more particularly emphasize their implementation independence. Such components may be embodied by any number of software or hardware forms. For example, a component or module may be implemented as a hardware circuit comprising custom circuitry or off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. The executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as the command and control service) may take place on a different processing system (e.g., in a computer in a cloud-hosted data center), than that in which the code is deployed (e.g., in a test computing environment). Similarly, operational data may be included within respective components or modules, and may be embodied in any suitable form and organized within any suitable type of data structure. The operational data may be collected as a single data set, or may be distributed over different locations including over different storage devices.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A computing system, comprising:
   a processor; and
   a memory device including instructions embodied thereon, wherein the instructions, which when executed by the processor, configure the processor to perform operations for coordinating data processing among multiple processes of a software application, with operations that:
      execute a first process of the software application that operates with a first capability that is limited to an operational constraint of the computing system;
      in response to receiving a demand from the software application for a second process of the software application with a second capability that exceeds the operational constraint of the computing system, spawn the second process from the first process of the software application,
      the second process spawned as a child of the first process, and the first process and the second process each created by the software application, wherein the second process operates with the second capability that exceeds the operational constraint of the computing system;
      communicate data within the software application from the first process of the software application to the second process of the software application, the software application second process being adapted to perform data analysis operations on the data; and
      communicate second data from the second process to the first process, in response to the data being processed by the data analysis operations of the second process.

2. The computing system of claim 1, wherein the operational constraint imposes a constraint for execution in a 32-bit address space of the computing system, the first process compiled into a 32-bit version for operation in the 32-bit address space of the computing system, and the second process compiled into a 64-bit version for operation in a 64-bit address space of the computing system.

3. The computing system of claim 2, wherein the first process is a front-end process that provides a user interface, the second process is a back-end process that provides a data processing function, the first process executes with a 32-bit instruction set of hardware of the computing system, and the second process executes with a 64-bit instruction set of the hardware of the computing system.

4. The computing system of claim 1, wherein the operational constraint of the computing system enforced at least in part from a user-defined parameter, and the user-defined parameter indicates an architectural parameter defined by available hardware or software capabilities of the computing system.

5. The computing system of claim 1, wherein the operational constraint relates to at least one of: bitwise compatibility, a version of an operating system, a compatibility mode within an operating system, a version of the software application, a hardware architecture, a version of a hardware component of the computing system, availability of a data provider for a hardware architecture of the computing system, or an operational user preference.

6. The computing system of claim 1, with the instructions to configure the processor to perform further electronic operations that:
   spawn and execute an extension component within the first process, the extension component operates with the first capability limited to the operational constraint of the computing system.

7. The computing system of claim 6, wherein the extension component is executable as a plug-in or a Component Object Model (COM) add-in within the first process, the extension component executable to perform data processing operations in the software application, and the operational constraint is execution as a 32-bit version for operation in a 32-bit address space of the computing system.

8. The computing system of claim 1, with the instructions to configure the processor to perform further electronic operations that:
   execute the second process on the computing system, execution of the second process includes performance of the data analysis operations on the data provided from the first process;
   execution of the second process with the second capability utilizes additional resources of the computing system beyond those available with the first capability; and
   wherein the communication of data between the first process and the second process occurs via an interprocess communication mechanism within the computing system.

9. The computing system of claim 1, wherein the first process executes on the computing system, the second process executes on a remote computing system, and the communication of data between the first process and the second process occurs via a network communication protocol.

10. The computing system of claim 1, wherein the second process further spawns a third process of the software application, the third process spawned as a child process operating under the second process.

11. A method, comprising a plurality of operations executed with a processor and memory of a computing system, for coordinating data processing among multiple processes of a software application, with the plurality of operations including:
   executing a first process of the software application that operates with a first capability that is limited to an operational constraint of the computing system;
   in response to receiving a demand from the software application for a second process of the software application with a second capability that exceeds the operational constraint of the computing system, spawning the second process from the first process of the software application, the second process spawned as a child of the first process, the first process and the second process each created by the software application, wherein the second process operates with the second capability that exceeds the operational constraint of the computing system;

communicating data within the software application from the first process of the software application to the second process of the software application, the second process being adapted to perform data analysis operations on the data; and communicating second data from the second process to the first process, in response to the data being processed by the data analysis operations of the second process.

12. The method of claim 11, wherein the operational constraint imposes a constraint for execution in a 32-bit address space of the computing system, the first process compiled into a 32-bit version for operation in the 32-bit address space of the computing system, the second process compiled into a 64-bit version for operation in a 64-bit address space of the computing system, the first process executes with a 32-bit instruction set of hardware of the computing system, and the second process executes with a 64-bit instruction set of the hardware of the computing system.

13. The method of claim 11, wherein the operational constraint of the computing system enforced at least in part from a user-defined parameter, and the user-defined parameter indicates an architectural parameter from among available hardware or software capabilities of the computing system.

14. The method of claim 11, wherein the operational constraint relates to at least one of: bitwise compatibility, a version of an operating system, a compatibility mode within an operating system, a version of the software application, a hardware architecture, a version of a hardware component of the computing system, availability of a data provider for a hardware architecture of the computing system, or an operational user preference.

15. The method of claim 11, the plurality of operations further including:

spawning and executing an extension component within the first process, the extension component operates with the first capability limited to the operational constraint of the computing system;

the extension component is a plug-in or a Component Object Model (COM) add-in of the software application; and the extension component executable to perform data processing operations in the software application, and the operational constraint is execution as a 32-bit version for operation in a 32-bit address space of the computing system.

16. A non-transitory device-readable storage medium, the device-readable storage medium including instructions for coordinating data processing among multiple processes of a software application, with the instructions, when executed by a processor and memory of a computing system, cause the computing system to perform operations that:

execute a first process of the software application that operates with a first capability that is limited to an operational constraint of the computing system;

in response to receiving a demand from the software application for a second process of the software application with a second capability that exceeds the operational constraint of the computing system, spawn the second process from the first process of the software application, the second process spawned as a child of the first process, and the first process and the second process each created by the software application, wherein the second process operates with second capability that exceeds the operational constraint of the computing system;

communicate data within the software application from the first process of the software application to the second process of the software application, the second process being adapted to perform data analysis operations on the data; and communicate second data from the second process to the first process, in response to the data being processed by the data analysis operations of the second process.

17. The device-readable storage medium of claim 16, wherein the operational constraint imposes a constraint for execution in a 32-bit address space of the computing system, the first process compiled into a 32-bit version for operation in the 32-bit address space of the computing system, the second process compiled into a 64-bit version for operation in a 64-bit address space of the computing system, the first process executes with a 32-bit instruction set of hardware of the computing system, and the second process executes with a 64-bit instruction set of the hardware of the computing system.

18. The device-readable storage medium of claim 16, wherein the operational constraint of the computing system enforced at least in part from a user-defined parameter, and the user-defined parameter indicates an architectural parameter defined by available hardware or software capabilities of the computing system.

19. The device-readable storage medium of claim 16, wherein the operational constraint relates to at least one of: bitwise compatibility, a version of an operating system, a compatibility mode within an operating system, a version of the software application, a hardware architecture, a version of a hardware component of the computing system, availability of a data provider for a hardware architecture of the computing system, or an operational user preference.

20. The device-readable storage medium of claim 16, the instructions to cause the computing system to further to perform operations that:

spawn and execute an extension component within the first process, the extension component operates with the first capability limited to the operational constraint of the computing system;

the extension component is a plug-in or a Component Object Model (COM) add-in of the software application; and the extension component executable to perform data processing operations in the software application, and the operational constraint is execution as a 32-bit version for operation in a 32-bit address space of the computing system.

* * * * *